United States Patent [19]

Vicik et al.

[11] Patent Number: 4,758,463
[45] Date of Patent: Jul. 19, 1988

[54] COOK-IN SHRINK FILM

[75] Inventors: Stephen J. Vicik, Darien; Gary A. Rejniak, Chicago, both of Ill.

[73] Assignee: Viskase Corporation, Chicago, Ill.

[21] Appl. No.: 946,721

[22] Filed: Dec. 29, 1986

[51] Int. Cl.$^4$ ............................................. B32B 7/02
[52] U.S. Cl. ..................................... 428/216; 428/35; 428/349; 428/520; 428/475.8
[58] Field of Search ................. 428/516, 349, 35, 518, 428/343, 216, 520, 475.8

[56] References Cited

U.S. PATENT DOCUMENTS

| | | | |
|---|---|---|---|
| 3,595,740 | 7/1971 | Gerow | 428/516 |
| 4,064,296 | 12/1977 | Bornstein et al. | 428/35 |
| 4,095,012 | 8/1976 | Shirmer | 428/474 |
| 4,104,404 | 3/1975 | Bieler et al. | 428/35 |
| 4,197,326 | 8/1978 | Wakamatsu et al. | 426/412 |
| 4,233,367 | 11/1980 | Ticknor et al. | 428/515 |
| 4,254,169 | 3/1981 | Schroeder | 428/35 |
| 4,352,702 | 10/1982 | Bornstein | 156/84 |
| 4,469,742 | 1/1983 | Oberle et al. | 428/215 |
| 4,495,249 | 1/1985 | Ohya et al. | 428/516 |
| 4,615,922 | 10/1986 | Newsome et al. | 428/35 |
| 4,615,926 | 10/1986 | Hsu et al. | 428/35 |

OTHER PUBLICATIONS

Du Pont Company Publication "Bynel CXA E-162" Series 3000.

Primary Examiner—Edith Buffalow
Attorney, Agent, or Firm—John C. LeFever

[57] ABSTRACT

An irradiated three layer heat-shrinkable plastic film for cook-in applications comprising a core layer of EVOH and Nylon blend as an oxygen barrier, and first and second outer layers each comprising a blend of EVA and ethylene vinyl acetate-anhydride functionality compound.

17 Claims, No Drawings

COOK-IN SHRINK FILM

BACKGROUND OF THE INVENTION

This invention relates generally to heat shrinkable, relatively gas impermeable thermoplastic film which can be heat sealed to itself to form a flexible package. More particularly, it relates to a multilayer plastic film which can be used in the form of a hermetically sealed bag for packaging food products wherein the packaged product is submerged in heated water for cooking. Under these conditions the bag film is shrinkable and retains its integrity.

There are numerous requirements for a cook-in shrink film including: delamination resistance, low oxygen permeability, heat shrinkability representing about 30–50% biaxial shrinkage at about 90° C., and optical clarity.

The prior art has developed a number of multilayer plastic cook-in films and certain of these are in commercial use. For example Bieler et al U.S. Pat. No. 4,104,404 describes a ten layer film comprising four central Nylon layers, an ionomer layer on each outer side of the central layers, and two outer polyethylene layers on each outer side of the ionomer layers. The patentee demonstrates that delamination of the outer polyethylene layer under cook-in conditions was only avoided by irradiation dosage of the entire multilayer film at a level of at least 6 MR.

Another commercially employed cook-in film is the type described in Oberle et al U.S. Pat. No. 4,469,742, also comprising six layers irradiated to dosage of at least 6 MR. The central barrier layer is hydrolyzed ethylene-vinyl acetate copolymer (EVOH), chosen because of its higher softening point and superior oxygen barrier properties as compared to the saran-type barrier layer commonly used in multilayer films for ambient temperature applications. On each side of the barrier layer is an adhesive layer such as chemically modified polyethylene, eg. Plexar. On the outer side of each adhesive layer is a shrink layer such as ethylene-vinyl acetate copolymer (EVA), and the outside (abuse) layer is also the EVA type having a vinyl acetate content of about 5–12 wt. %. The innermost (heat sealing) layer may for example be a propylene-ethylene random copolymer (PER).

It will be apparent from the foregoing that these prior art cook-in films are complex both in terms of multiple materials and sophisticated manufacturing techniques i.e., six layers and relatively high irradiation dosage level to avoid delamination.

A possible solution to the foregoing problems is a three layer film with EVOH as the barrier layer, but tests have shown that such prior art three layer films either would not biorient, would tend to delaminate during cooking or have poor optical properties or have unacceptably low shrink value for cook-in applications, or a combination of these problems. Certain of these problems may be overcome by the use of EVOH-polyamide blend core layers, but three layer films of this type with EVA inner and outer layers have typically been found to delaminate under cook-in conditions. A possible approach to this delamination problem is the use of adhesives, but EVA-EVOH type adhesives would be expected to create blocking problems, i.e., adhesion of adjacent inner EVA layers during manufacture of the film. To avoid the blocking problem, the prior art has provided additional layers on the inside of the adhesion layer or adhesive-containing blend layer, i.e., the aforementioned six layer film.

An object of this invention is to provide an improved cook-in type multilayer plastic film which has less than six layers.

Another object is to provide a three layer cook-in plastic film which is relatively easy to process, i.e., may be readily bioriented.

Still another object is to provide a three layer cook-in type film having high shrink, good optical properties and good inner layer adhesion, and no blocking problem.

A further object of this invention is to provide such a three layer cook-in type film which does not require additives such as processing aids and does not require high irradiation dosage levels on the order of 6 MR to realize high strength.

Other objects and advantages will be apparent from the ensuing disclosure and appended claims.

SUMMARY OF THE INVENTION

It has been unexpectedly discovered that when a particular type of EVA and an EVA with anhydride functionality are blended in the first and second outer layers of EVOH-polyamide type core layer films to perform the adhesive function, these compositions do not create a blocking problem but actually function as antiblock agents during the extrusion process.

More specifically, in its broadest aspect, the invention is a three layer plastic film having a core layer of between about 60 and 90 weight percent hydrolyzed ethylene-vinyl acetate copolymer containing between about 32 and 40 weight percent ethylene, being blended with between about 10 and 40 weight percent amide polymer having a melting point below about 420° F., the core layer providing an oxygen transmission rate below about 90 cc/M$^2$/mil thickness/24 hours/Atm.

This film also has first and second outer layers directly adhered to opposite sides of the core layer comprising a blend of ethylene vinyl acetate containing between about 7 and 15 wt. % vinyl acetate, and between about 5 and 20 wt. % of an ethylene vinyl acetate-anhydride functionality compound. The film is irradiated at a level of between about 1 and 5 MR.

As will be demonstrated hereafter, this film is relatively easy to process, i.e., may be readily oriented, is not delaminated under cook-in conditions, has good optical properties and affords the desired high shrink value of prior art six layer cook-in films. Moreover it is easier to manufacture because of the fewer number of layers and lower irradiation dosage level. This advance in the cook-in film art is verified by applicants' belief that based on presently available information, the prior art has not disclosed an EVOH-type barrier layer cook-in film meeting commercial requirements with only three layers.

In a preferred embodiment, the three layer film is fabricated into a bag form with the first outer layers enclosing the product in contigious association.

DEFINITIONS

As used herein, the terms set forth below will be understood to have the following meanings:

"Polymer" includes homopolymers, copolymers, terpolymers and block, graft or random polymers.

"Amide" or "amide polymer" means a Nylon including polycaproamide, poly(hexamethylene, adipamide), polyhexamethylene sebacamide, polycaprylamide, polyundecanoamide, and polycrodecanamide. These Nylons are respectively normally known as Nylon 6; Nylon 6,6; Nylon 6,10; Nylon 6,12; Nylon 8; Nylon 11; and Nylon 12. The preferred amide polymer in the film of this invention is Nylon 6,66 (Chemical Abstract Service Number 24993-04-2).

"Hydrolyzed ethylene-vinyl acetate" or "EVOH" means a hydrolyzed ethylene-vinyl acetate copolymer, preferably hydrolyzed to at least about 50%, most preferably to greater than about 99%. These compositions are also referred to as ethylene-vinyl alcohols and are ordinarily prepared by saponification, so are sometimes called "saponified ethylene-vinyl acetate copolymers".

"Cook-in" refers to packaging material structurally capable of withstanding exposure to long and slow cooking conditions while containing a food product, for example submersion in water at 70°-80° C. for 4-6 hours. Cook-in packaged foods are essentially pre-packaged, pre-cooked foods which are directly transferred to the consumer in this form. These types of foods may be consumed with or without warming. Cook-in packaging materials maintain seal integrity and in the case of multilayer films, are delamination resistant. Cook-in films must also be heat shrinkable under cook-in conditions so as to form a tightly fitting package. Preferably they also have a tendency for adhesion to the food product, thereby preventing "cook-out", which is the collection of juices between the outer surface of the food product and the inner surface of the film.

"Linear low density polyethylene" or "LLDPE" means copolymers of ethylene and certain other heavier olefins as for example butene, hexene and octene, having a density of at least about 0.91 gm/cm$^3$ and below about 0.94 gm/cm$^3$.

"Anhydride" means a compound (usually an acid) from which water has been removed. An example is maleic anhydride.

"Ethylene vinyl acetate-anhydride functionality compound" comprises with: (a) ethylene-vinyl acetate-anhydride terpolymers and (b) ethylene vinyl acetate with anhydride grafted thereto.

"Irradiation" means exposure to high energy radiation such as electrons, X-rays, gamma rays, beta rays and the like, which induce cross-linking between the molecules of the irradiated material. Preferably, irradiation is carried out by an electron accelerator and the dosage level is determined by standard dosimetry methods. The dosage is measured in "rads" wherein one rad is the absorbed dose of ionizing radiation equal to an energy of 100 ergs per gram of irradiation material. A megarad (MR) is one million rads.

DETAILED DESCRIPTION

With respect to the core layer, the amide polymer performs a plasticizing function for the hydrolyzed ethylene vinyl acetate copolymer (EVOH) which is the oxygen barrier component. The amide polymer must comprise at least 10 wt. % of the amide polymer-EVOH blend for processing, i.e., stretchability, into a biaxially oriented film. On the other hand, to retain the oxygen barrier performance the amide polymer should not comprise more than about 40 wt. % of the blend. As a preferred balance of these characteristics, the core layer comprises between about 60 and 90 wt. % hydrolyzed ethylene-vinyl acetate copolymer blended with between about 40 and 10 wt. % amide polymer.

The EVOH contains at least 32 wt. % ethylene to achieve the desired film shrinkage and stretching characteristics, and less than about 40 wt. % ethylene to achieve bubble integrity at the required stretch conditions. As a preferred balance of these characteristics, the hydrolyzed ethylene-vinyl acetate copolymer contains between about 32 and 38 wt. % ethylene.

The melting point of the amide polymer is below about 420° F. for compatability with the EVOH copolymer which typically melts between about 345° and 365° F. Higher melting amide polymers are not suitable because of the presence of gels and unmelted particles in the final film extruded at temperatures suitable for EVOH without degradation.

The core layer constituents are provided in proportions and quantities such than the oxygen transmission rate through the entire multilayer film is below about 90 cc/M$^2$/mil thickness/24 hrs./Atm. This is necessary to avoid spoilage of the food enclosed in the cook-in film due to oxygen passage from the environment through the film wall. The core layer thickness is preferably up to about 0.3 mils to perform its intended function for the cook-in application. Thicker core layers do not appreciably improve performance. The core layer is most preferably between about 0.05 and 0.2 mils thick to perform its intended function and provide maximum flexibility.

The first outer layer of this multilayer film is directly adhered to one side of the core layer, and in direct contact with the outer surface of the stored food product. This layer is primarily responsible for processability of this film, for example affording the needed stretchability for biaxial orientation. This layer comprises a blend of EVA containing between about 7 and 15 wt. % vinyl acetate, and between about 5 and 20 wt. % of an ethylene vinyl acetate-anhydride functionality compound. The vinyl acetate content should be at least 7 wt. % of the EVA to provide the desired high shrink, but no higher than about 15 wt. % to allow the needed biaxial orientation. Higher vinyl acetate content makes the film excessively soft and not capable of biaxial orientation. A preferred balance between these characteristics is a vinyl acetate content of between about 9 and 12 wt. % of the ethylene vinyl acetate.

The ethylene vinyl acetate-anhydride functionality compound ("EVA-anhydride") content of the first outer layer is at least about 5 wt. % to permit the needed adhesion under cook-in conditions and avoid blocking, and not more than about 20 wt. % to keep the melt index of the first outer layer in the desired range for orientation and also to retain the desired good optical properties. These comprise a high gloss of at least 60% and low haze of below about 12%. Higher percentages of the EVA-anhydride excessively increase the melt index and decrease the melt strength of the first outer layer so that it would not provide the needed film stretchability. As a preferred balance of these characteristics, the first outer layer contains between about 8 and 12 wt % EVA-anhydride.

The thickness of the first outer layer is preferably between about 1.2 and 2.6 mils. Thinner layers may not perform the aforedescribed function while thicker layers do not appreciably improve processability of the film and may reduce film stretchability.

The second outer layer of this film is directly adhered to the outer side of the core layer (opposite to the first outer layer), and comprises a blend of EVA containing between about 7 and 15 wt. % vinyl acetate and between about 5 and 20 wt. % of the aforementioned ethylene vinyl acetate-anhydride. This layer is in direct contact with the environment including the heating liquid during cook-in. Since it is seen by the user/consumer, it must enhance optical properties of the film. Also, it must withstand contact with sharp objects so is termed the abuse layer and provides abrasion resistance. As with the first outer layer, the vinyl acetate content should be at least 7 wt. % of the EVA to provide the desired high shrink, but no higher than about 15 wt. % to allow the needed biaxial orientation. A preferred balance between these characteristics is a vinyl acetate content of between about 9 and 12 wt. % of the ethylene vinyl acetate.

The second outer layer thickness is preferably between about 0.3 and 1.0 mils. Thinner layers may be less effective in performing the abuse resistance protection, while thicker layers may not improve performance in this respect and may reduce film stretchability. The multiple layer film of this invention is irradiated at a level of between about 1 and 5 MR to increase its layer adhesion strength at cook-in conditions. Lower irradiation levels do not provide improved strength and higher levels tend to degrade the elongation properties of the film. A preferred balance is between about 2 and 4 MR. Irradiation may be performed prior to biaxial orientation but is preferably done after this step on the stretched and thinner film.

The second outer layer should contain at least 5 wt. % of the EVA-anhydride because it must provide good adhesion and resist delamination under cook-in conditions, and also prevent blocking. The second outer layer's EVA-anhydride content should not exceed 20 wt. % because higher levels excessively increase the melt index and decrease the melt strength of the second outer layer so that it would not provide the needed film abuse resistance. As a preferred balance of these conderations, the second outer layer's EVA-anhydride content is between about 8 and 12 wt. %.

The thickness of the aforedescribed three layer film is preferably between about 2.0 and 3.5 mils. Lower thicknesses reduce the effectiveness of at least one of the three layers to perform the aforedescribed functions, while higher thicknesses reduce the film flexibility and do not appreciably improve its performance.

In general, various conventional additives such as slip agents and pigments can be incorporated in the film in accordance with conventional practice.

While this invention is specifically described in terms of three layers, it should be understood that one or more additional layers may be directly adhered to the outside of either the first outer layer or the second outer layer, but not between these layers and the core layer. By way of example, for improved meat adhesion certain ionomers may be added as a fourth layer to the first outer layer. The metal salt of an ethylene/organic acid copolymer sold by the DuPont Company under the product designation Surlyn 1650 is suitable for this purpose.

The multilayer film of this invention is preferably manufactured in tubular form by simultaneous co-extrusion of the three layers using the conventional double bubble technique. This primary tube is biaxially oriented by stretching with internal pressure in the transverse direction and with the use of pinch rolls at different speeds in the machine direction. Then the bubble is collapsed. After cooling, the biaxially oriented tube is flattened and guided through an ionizing radiation field at a dosage of between about 1 and 5 MR.

The stretch ratio in the biaxial orientation is preferably sufficient to provide a multilayer film with total thickness of between about 2.0 and 3.5 mils. A stretch ratio of about 8-15:1 will impart a shrink capacity of about 30-35% biaxial free shrinkage at 90° C. (based on ASTM D27323).

The multilayer film in wound up as flattened, seamless, tubular film to be used later to make bags. This may be accomplished by end seals, typically made by transverse heat sealing across the width of flattened tubing followed by severing the tubing so that the transverse seal forms the bag bottom. Alternatively side-seal bags may be formed in which the transverse seals form the bag sides and one edge of the tubing forms the bag bottom.

Cook-in bags are used by placing the food product in the bag, evacuating the bag and sealing the open portion as by clipping. The evacuated product-containing bag is then immersed in a hot liquid bath typically about 150° to 190° F., to uniformly shrink the film against the product outer surface.

EXAMPLE 1

In this example an embodiment of the three layer film of this invention was compared with an apparently six layer commercially available cook-in film of the general type described in the aforementioned U.S. Pat. No. 4,469,742.

The inventive embodiment (sample 1) was prepared by simultaneous coextrusion of three layers to form a film including a 0.1 mil thick core layer of 80 wt. % hydrolyzed ethylene vinyl acetate copolymer containing 38 wt. % ethylene, blended with 20 wt. % Nylon 6,66 copolymer. This particular amide polymer has a melting point of about 405° F. The oxygen transmission rate of this core layer was about 40 cc/$M^2$/mil thickness/24 hrs/Atm. The first and second outer layers of sample 1 comprised a blend of 90 wt. % ethylene vinyl acetate containing about 12 wt. % vinyl acetate, and 10 wt. % of an ethylene-vinyl acetate-maleic anhydride terpolymer sold by the DuPont du Nemors Company under the product designation Bynel CXA E-162. This composition has a melt index of 0.8 dg/min (ASTM D-1238), density of 926 kg/$m^3$ (ASTM D-1505). melting point of 85° C. (185° F.) and Vicat softening point of 60° C. (140° F.). The first and second outer layer thicknesses were 2.0 mils and 0.7 mils respectively and the total film thickness was about 2.8 mils.

The prior art cook-in film was manufactured by W. R. Grace Company's Cryovac Division and sold with a product designation CN-510. It appeared to comprise six layers.

Samples 1 and 2 were tested for optical properties, % shrink, and seal strength at 90° C. (194° F.) (a commercially acceptable criteria), the results being summarized in Table A.

TABLE A

| Film Sample No. | Haze % | Gloss (45°) % | % Shrink MD/TD | Secant Modulus PSI | Seal |
|---|---|---|---|---|---|
| 1 | 2 | 85 | 41/44 | 15 M | Good |
| 2 | 15 | 50 | 32/43 | 20 M | Good |

Table A demonstrates that the optical, strength and seal properties of the three layer inventive film are at least equivalent to a prior art commercially employed cook-in film appearing to have six layers.

EXAMPLE 2

In this example, the aforedescribed inventive sample 1 was compared with EVOH-type core layer films wherein the first outer layer was either 100% EVA or 100% LLDPE of the butene-1 copolymer type. Sample 3 comprised a 100% EVOH (32 wt. % ethylene) core layer, a 100% ethylene vinyl acetate (12 wt. % vinyl acetate) first outer layer, and a 100% ethylene vinyl acetate (12 wt. % vinyl acetate) second outer layer. Sample 4 comprised a 70 wt. % ethylene vinyl acetate (32 wt. % ethylene) and 30 wt. % Nylon 6,66 blend as the core layer, a 100% LLDPE of the butene-1 and ethylene copolymer type as the first outer layer, and a 100% ethylene vinyl acetate (12 wt. % vinyl acetate) second outer layer.

It was discovered that sample 3 was very difficult to biaxially stretch and that sample 4 had unacceptably low shrink values of 14% MD and 22% TD. Based on a comparison with sample 1, it is apparent that the first and second outer layer must comprise a blend of ethylene vinyl acetate and the ethylene vinyl acetate-anhydride functionality compound for biorientation and high shrink values.

EXAMPLE 3

In this example, the aforedescribed inventive sample 1 was compared with EVOH-Nylon blend core layer films having 100% LLDPE first outer layer films of the 1-butene copolymer type. Sample 5 had a 20 wt. % Nylon 6,66-80 wt. % EVOH (32 wt. % ethylene) core layer, a 100% LLDPE first outer layer of the 1-butene copolymer type (Union Carbide Corporation product designation 7510) and a second outer layer identical to the first outer layer. Sample 6 had a 30 wt. % Nylon 6,66-70 wt. % EVOH (32 wt. % ethylene) core layer, a 100% LLDPE first outer layer of the aforementioned 1-butene copolymer type and a 100% ethylene vinyl acetate (12 wt. % vinyl acetate) second outer layer. Samples 5 and 6 were tested for optical properties, % shrink, modulus of elasticity, and their results are compared with sample 1 in Table B.

TABLE B

| Film Sample No. | Haze % | Gloss (45°) % | % Shrink MD/TD | Secant Modulus PSI | Seal |
|---|---|---|---|---|---|
| 1 | 2 | 85 | 41/44 | 15 M | Good |
| 5 | 13 | 48 | 15/21 | 65 M | Good |
| 6 | — | — | 14/22 | — | Good |

Table B shows that the outstanding optical and high shrink values of this invention cannot be achieved with a three layer EVOH and Nylon blend type core layer, using a 100% LLDPE first outer layer of the 1-butene type.

EXAMPLE 4

In this example, the optical and shrink properties of sample 1 were compared with an EVOH-Nylon blend core layer film having a 90 wt. % ethylene vinyl acetate-10 wt. % polyethylene-based adhesive blend as the first and second outer layers. Sample 7 had an 80 wt. % EVOH (32 wt. % ethylene)-20 wt. % Nylon 6,66 blend core layer. The first and second outer layers comprised 10 wt. % of a polyethylene-based adhesive purchased from Mitsui Company as their product designation, Admer 500. The latter is believed to be a LLDPE based resin with anhydride functionality but without EVA. The results of the tests are summarized in Table C.

TABLE C

| Film Sample No. | Haze % | Gloss (45°) % | % Shrink MD/TD |
|---|---|---|---|
| 1 | 2 | 85 | 41/44 |
| 7 | 16 | 46 | 26/31 |

Table C shows that the outstanding optical and high shrink values of this invention cannot be achieved with a three layer EVOH and nylon blend type core layer using 90% EVA-10% polyethylene based adhesive first and second outer layers. By way of comparison with the ethylene-vinyl acetate-anhydride terpolymer constituent of the inventive film, the adhesive of sample 7 contains anhydride and ethylene copolymer but no vinyl acetate.

EXAMPLE 5

In this example, the delamination characteristics of sample 1 were compared with two different three layer films, each having a 70 wt. % ethylene vinyl acetate (12 wt. % vinyl acetate) and 30 wt. % Nylon 6,66 blend as the core layer. For sample 8 the first outer layer was 60 wt. % EVA-40 wt. % LLDPE of the ethylene-butene-1 copolymer type, and the second outer layer was 100 wt. % EVA (12 wt. % vinyl acetate). For sample 9 the first outer layer was 50 wt. % LLDPE of the ethylene-butene-1 copolymer type and 50 wt. % EVA containing 12 wt. % vinyl acetate, and the second outer layer was 100 wt. % EVA (12 wt. % vinyl acetate).

The conditions for testing the structural integrity of the samples for cook-in service was one hour immersion at 90° C. Under these conditions, samples 8 and 9 delaminated while sample 9 remained intact.

EXAMPLE 6

Sample 1 was formed into a seamed tube with one end sealed. The resulting article was hand stuffed with chunked and sweet pickled ham, placed in a mold and cooked in hot water.

Another such article was hot water cooked without use of a mold. The heating regime was a hot water bath at 180° F. for five hours, then 190° F. until the internal temperature reached 155° F. The sample 1 article survived mold cooking without breakage or film delamination. This performance was similar to the aforementioned apparently six layer commercially employed film sold by W. R. Grace Company under the product designation CN-510, used as the control. Adhesion of the control film to the cooked ham was superior to sample 1, but high adhesion to the product is not desirable for all cook-in films and is not needed for the present film. The sample 1 article cooked without a mold was observed to split at the seam, but this was of no particular significance as a commercial embodiment would probably be in the form of a seamless tube. The optical properties of sample 1 when off the product were similar to the control, and sample 1 was considered commercially acceptable.

EXAMPLE 7

This example compares the blocking characteristics during extrusion of the sample 1 embodiment of the invention with two other three layer films having the same type of EVOH-Nylon blend core layer but EVA and polyethylene first and second outer layers without the anhydride-ethylene vinyl acetate terpolymer. Sample 10 had 70 wt. % EVOH-30 wt. % Nylon 6,66 blend core layer, a 85 wt. % EVA (12 wt. % vinyl acetate)-15 wt. % high density polyethylene (density of 0.950) first outer layer, and a 100% LLDPE of the butene-1 copolymer type as the second outer layer. Sample 11 had a 60 wt. % LLDPE of the butene-1 copolymer type-40 wt. % EVA (12 wt. % vinyl acetate) first outer layer, the same core layer as sample 10 and a 100% EVA (12 wt. % vinyl acetate) second outer layer. The blocking characteristics of the primary tube formed from these films are compared in Table D as follows:

TABLE D

| Film Sample No. | Blocking Characteristics Of Primary Tube |
| --- | --- |
| 1 | No lamination |
| 10 | Unstable; first inner layers laminated together |
| 11 | Slightly tacky; first inner layers caused wrinkles |

Table D demonstrates that the maleic anhydride terpolymer-containing first and second outer layers unexpectedly prevents blocking, in contrast to similar films without the terpolymer. This was surprising because such terpolymers are described by the manufacturer as providing high interlayer adhesion when EVOH barrier resins are melt extruded with EVA resins. On this basis, one would have expected contiguous EVA and terpolymer-containing outer layers of the primary tube to adhere together and create a blocking problem.

In a preferred embodiment, the three layer plastic film of the invention comprises three layers, including a core layer of between about 75 and 85 wt. % hydrolyzed ethylene-vinyl acetate copolymer containing between about 32 and 38 wt. % ethylene and blended with between about 15 and 25 wt. % Nylon 6,66 copolymer, said core layer having an oxygen transmission rate below about 75 cc/M²/mil thickness/24 hrs/Atm and thickness of between about 0.05 and 0.2 mils. The first outer layer is of thickness between about 1.2 and 2.6 mils, directly adhered to one side of the core layer and comprises a blend of ethylene vinyl acetate containing between about 9 and 12 wt. % vinyl acetate, and between about 8 and 12 wt. % Bynel CXA E-162 terpolymer. The second outer layer is of thickness between about 0.3 and 1.0 mils, directly adhered to the other side of the core layer and comprises a blend of ethylene-vinyl acetate containing between about 9 and 12 wt. % vinyl acetate, and between about 8 and 12 wt. % Bynel CXA E-162 terpolymer.

While the preferred embodiments of the invention have been disclosed hereinabove, those skilled in the art will appreciate that changes and modifications may be made therein without departing from the spirit and scope of the invention.

What is claimed is:

1. A three layer plastic film comprising:
   (a) a core layer of between about 60 and 90 wt. % hydrolyzed ethylene vinyl acetate copolymer containing between about 28 and 40 wt. % ethylene and blended with between about 10 and 40 wt. % amide polymer having a melting point below about 420° F., said core layer providing an oxygen transmission rate through the film below about 90 cc/m²/mil thickness/24 hrs/Atm;
   (b) a first outer layer directly adhered to one side of said core layer comprising a blend of ethylene vinyl acetate containing between about 7 and 15 wt. % vinyl acetate, and between about 5 and 20 wt. % of an ethylene vinyl acetate-anhydride functionality compound; and
   (c) a second outer layer directly adhered to the other side of said core layer and comprising ethylene vinyl acetate containing between about 7 and 15 wt. % vinyl acetate, and between about 5 and 20 wt. % of an ethylene vinyl acetate-anhydride functionality compound;
   (d) said film having been irradiated at a level of between about 1 and 5 MR.

2. A film according to claim 1 wherein said ethylene vinyl acetate-anhydride functionality compound comprises between about 8 and 12 wt. % of said first outer layer.

3. A film according to claim 1 wherein said ethylene vinyl acetate-anhydride functionality compound comprises between about 8 and 12 wt. % of said second outer layer.

4. A film according to claim 1 wherein said amide polymer in the core layer is a Nylon 6 copolymer.

5. A film according to claim 2 wherein said Nylon 6 copolymer is Nylon 6, 66.

6. A film according to claim 1 wherein said hydrolyzed ethylene-vinyl acetate copolymer contains between about 32 and 38 wt. % ethylene.

7. A film according to claim 1 wherein the oxygen transmission rate of said core layer is below about 75 cc/M²/mil thickness/24 hrs/Atm.

8. A film according to claim 1 wherein the total thickness of the three layers is between about 2.0 and 3.5 mils.

9. A film according to claim 7 wherein the thickness of said core layer is up to about 0.3 mils.

10. A film according to claim 1 wherein the ethylene-vinyl acetate of said first outer layer contains between about 9 and 12 wt. % vinyl acetate.

11. A film according to claim 8 wherein the thickness of said first outer layer is between about 1.2 and 2.6 mils.

12. A film according to claim 1 wherein the ethylene vinyl acetate of said second outer layer contains between about 9 and 12 wt. % vinyl acetate.

13. A film according to claim 8 wherein the thickness of said second outer layer is between about 1.2 and 2.6 mils.

14. A film according to claim 1 which is irradiated at a level of between about 2 and 4 MR.

15. A film according to claim 1 wherein said ethylene vinyl acetate-anhydride functionality compound is a terpolymer.

16. A film according to claim 1 wherein said ethylene vinyl acetate-anhydride functionality compound is ethylene vinyl acetate with anhydride grafted thereto.

17. A three layer plastic film comprising:
   (a) a core layer of between about 75 and 85 wt. % hydrolyzed ethylene-vinyl acetate copolymer containing between about 32 and 38 wt. % ethylene and blended with between about 15 and 25 wt. % Nylon 6, 66 copolymer, said core layer having an oxygen transmission rate below about 75 cc/M²/mil thickness/24 hrs/Atm and thickness of between about 0.05 and 0.2 mils;
   (b) a first outer layer of thickness between about 1.2 and 2.6 mils directly adhered to one side of said core layer comprising a blend of ethylene vinyl acetate containing between about 9 and 12 wt. % vinyl acetate, and between about 8 and 12 wt. % ethylene vinyl acetate-anhydride functionality terpolymer; and (c) a second outer layer of thickness between about 0.3 and 1.0 mils directly adhered to the other side of said core layer and comprising a blend of ethylene-vinyl acetate containing between about 9 and 12 wt. % vinyl acetate, and between about 8 and 12 wt. % ethylene vinyl acetate-anhydride functionality terpolymer; and (d) said film having a total thickness of between about 2.0 and 3.5 mils and having been irradiated at a level of between about 2 and 4 MR.

* * * * *

UNITED STATES PATENT AND TRADEMARK OFFICE
CERTIFICATE OF CORRECTION

PATENT NO. : 4,758,463

DATED : July 19, 1988

INVENTOR(S) : Stephen J. Vicik/Gary A. Rejniak

It is certified that error appears in the above-identified patent and that said Letters Patent is hereby corrected as shown below:

In Col. 6, line 6, change "ASTM D27323" to --ASTM D2732--.

Signed and Sealed this

Fourteenth Day of May, 1991

Attest:

HARRY F. MANBECK, JR.

*Attesting Officer*      *Commissioner of Patents and Trademarks*